Jan. 9, 1940.  C. L. HALLADAY  2,186,137
VEHICLE BUMPER
Filed Dec. 4, 1937
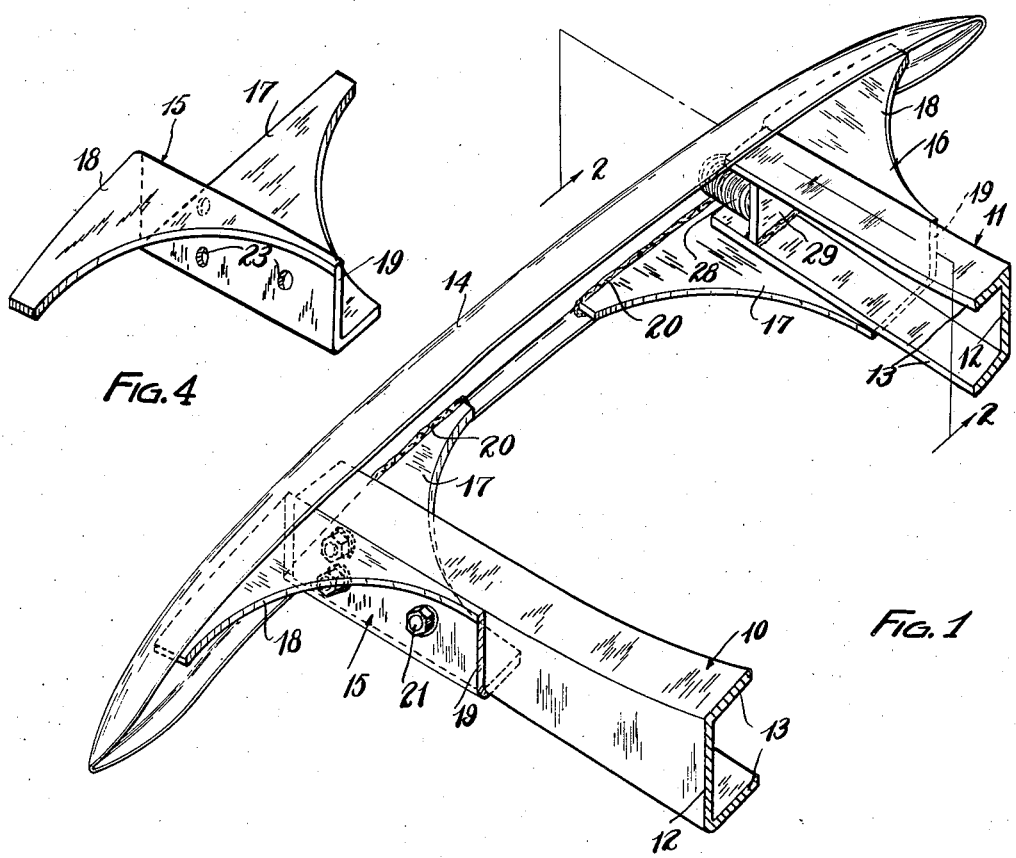
Fig. 4
Fig. 1
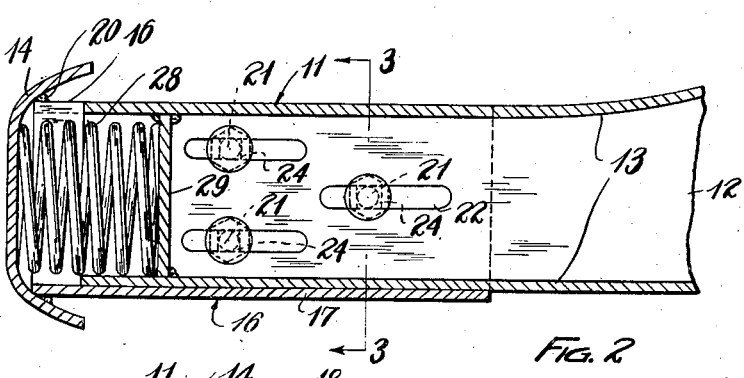
Fig. 2
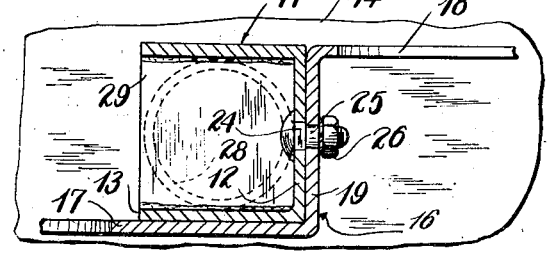
Fig. 3
INVENTOR.
CALVIN L. HALLADAY
BY Kwis Hudson & Kent
ATTORNEYS Patented Jan. 9, 1940

2,186,137

UNITED STATES PATENT OFFICE 2,186,137

VEHICLE BUMPER

Calvin L. Halladay, Jackson, Mich., assignor to Eaton Manufacturing Company, Cleveland, Ohio, a corporation of Ohio Application December 4, 1937, Serial No. 178,117

4 Claims. (Cl. 293—55)

This invention relates to vehicle bumpers and as one of its objects aims to provide a construction in which the bumper is mounted directly on the longitudinal frame members of the vehicle or extensions thereof, whereby the back bars, arms, hangers and other numerous parts heretofore required for mounting bumpers can be eliminated, and whereby the styling and streamlining of the body of the vehicle can be improved by carrying sheet metal parts thereof substantially to the bumper itself.

Another object of my invention is to provide a novel bumper in which the impact bar is connected at spaced points with the frame members of the vehicle and itself constitutes a transverse frame-connecting member.

A further object of my invention is to provide a novel bumper construction in which the impact bar is movable relative to the vehicle frame and has connecting means adapted for sliding engagement with the frame for guiding such relative movement of the impact bar.

Still another object of my invention is to provide a bumper construction wherein the impact bar is movable relative to the vehicle frame and resilient cushioning means is disposed between the impact bar and the frame.

Other objects and advantages of my invention will be apparent from the following description when taken in conjunction with the accompanying drawing in which, Fig. 1 is a perspective view showing projecting portions of the frame members of a vehicle with my novel bumper construction applied thereto;

Fig. 2 is a partial longitudinal sectional view taken as indicated by line 2—2 of Fig. 1;

Fig. 3 is a sectional view taken transversely of one of the frame members and through the bumper mounting means, as indicated by line 3—3 of Fig. 2, and Fig. 4 is a perspective view showing one of the bumper mounting brackets or clips in detached relation.

For a more detailed description of my novel bumper construction reference will be had to the accompanying drawing in which I have shown what I now regard to be a preferred embodiment of the invention. Before proceeding with the detailed description, however, it should be understood that the invention may be embodied in various other arrangements and forms of bumper construction.

In Fig. 1 of the drawing I show end portions of a pair of spaced longitudinal vehicle frame members 10 and 11 to which my novel bumper construction has been applied. As is usual in present-day vehicle frame construction, the members 10 and 11 may be channel-like members disposed with their backs or webs 12 extending upright and with their pairs of flanges 13 extending inwardly toward each other.

According to my invention I arrange a bumper impact bar 14 to extend transversely of the frame members 10 and 11 and connect the impact bar therewith so that it constitutes a transverse connecting member which will maintain the transverse spacing of the frame members. I also provide for yieldability of the impact bar by mounting the same on the frame members 10 and 11 so as to permit relative forward and rearward movement of the bar.

The impact bar 14 may be a member of any suitable form or construction which will have the required strength and rigidity to enable the bar to serve as a transverse frame connecting member. In this instance I show the impact bar 14 as being an elongated metal member of channel-like form, that is, having a convex shape on its forward or outward side and having a channel or recess in its rear or inner side. An impact bar having a recess in its rear side may be preferable because the ends of the frame member and other adjacent parts may be extended thereinto and thus partially concealed.

For mounting the impact bar on the frame members 10 and 11, I provide the bar with a pair of spaced brackets or clips 15 and 16 which are connected with the impact bar at the rear side thereof and extend rearwardly therefrom in engagement with the frame members. These brackets may be constructed as metal plates and may be so shaped that each bracket has oppositely extending wing-like portions 17 and 18 of varying width which lie in substantially parallel planes and are connected along their adjacent edges by a substantially normally disposed web 19. In other words, each bracket may be of substantially Z-like form, as shown in Fig. 4, so that the angularly disposed flange and web portions 17 and 19 thereof are adapted respectively to flatly engage and lie against web and flange portions 12 and 13 of the frame members. As can be readily seen from Fig. 4, these brackets may be relatively narrow at their inner ends and at their forward ends are relatively wide so that a connection, formed by welding 20 or other suitable means and extending for a substantial distance along the impact bar, can be made. It will also be noted that because of the Z-like form of the brackets, the connections between flanges 17 and 18 and the impact bar are spaced apart a substantial distance vertically of the latter, which provides a rigid construction.

The brackets 15 and 16 are of similar form, that is to say, are right and left-hand, and when applied to the frame members 10 and 11 the web portions 19 lie against the outer faces of the webs 12, and the flange portions 17 lie against and beneath the lower flanges 13 of the frame members.

With this arrangement it will be seen that the brackets hold the impact bar from shifting upwardly or laterally with respect to the frame members and the bar is thus constituted a transverse connecting member which maintains the lateral spacing of the frame members.

As mentioned above, the impact member 14 is movable forwardly and rearwardly with respect to the frame members 10 and 11, and to provide for this relative movement, the brackets 15 and 16 are connected with the frame members by means of bolts 21 which are shiftable in longitudinally extending slots 22 of the frame members. These bolts also extend through openings 23 of the brackets and are preferably formed with squared sections 24 which are slidable in the slots 22 and hold the bolts against turning. The stem portions 25 of the bolts are preferably of a length such that the web portions 19 of the brackets 15 and 16 may be clamped against the squared sections 24 by the nuts 26. The sliding engagement thus provided for between the brackets and the frame members serves to guide the movements of the impact bar so that this member will have very limited movement in any other direction than a direct fore and aft path. The slots 22 of the frame members may be of any desired length depending upon the extent of relative movement which the impact bar is to have, but it is considered that slots of a length to afford the impact bar a movement of from one to three inches are satisfactory.

For resisting movement of the impact bar 14 and normally urging the bar away from the frame members 10 and 11, I may provide an inherently resilient cushioning means which may be disposed between the bar and frame members. Any suitable cushioning means may be employed for this purpose, such as blocks of soft vulcanized rubber or the helical compression springs 28 shown in this instance. The cushioning means may be located in the recess of the frame member with one end thereof seating against the rear face of the impact bar and the other end thereof seating against a plate or buffer seat 29 which may be welded or otherwise secured in the frame member. These cushioning members yield to permit relative shifting of the bar 14 in response to an impact thereagainst and also serve to take up looseness and wear so as to prevent rattling and vibration.

I have referred to the members 10 and 11 as being end portions of the laterally spaced frame members of a vehicle chassis, and in this connection I desire it to be understood that these may be the usual frame members or may be extensions or projections thereof extending beyond such usual frame members. In other words, the members 10 and 11 may be vehicle frame members of such length that when the impact bar 14 is mounted adjacent the ends thereof, as shown in Fig. 1 the bar will have the desired location with respect to other parts of the vehicle.

From the foregoing description and the accompanying drawings it will be readily understood that I have provided a novel bumper construction which is of such simple and economical form that the required parts are greatly reduced in number and the need for the usual hangers, arms and back bars is entirely eliminated. It will be seen, furthermore, that the impact bar of my bumper arrangement also serves as a transverse frame connecting member and that yieldability of the impact bar is obtained by providing for relative fore and aft movement between the bar and the frame members. Moreover, my novel manner of mounting the impact bar on the frame members results in a desired guiding of such fore and aft movements of the bar. It will also be seen that my novel bumper construction contributes to the styling and streamlining of vehicle bodies by permitting the car designer to extend sheet metal parts of the body to, or substantially to, the bumper itself.

While I have illustrated and described my novel bumper construction in a somewhat detailed manner, it will be understood, of course, that I do not wish to be limited to the particular form of construction herein disclosed but regard my invention as including such changes and modifications as do not involve a departure from the spirit of the invention and the scope of the claims.

Having thus described my invention, I claim:

1. A bumper construction for a vehicle having spaced longitudinal frame members of channel-like cross-sectional shape, comprising an impact bar, and a pair of brackets connected with the bar at spaced points and adapted to engage said frame members for mounting the bumper thereon, said brackets each having angularly disposed web portions engageable with at least two angularly disposed faces of one of said frame members whereby the bumper is retained against vertical and lateral relative shifting.

2. A bumper construction for a vehicle having spaced longitudinal frame members of channel-like cross-sectional shape, comprising an impact bar and a pair of brackets connected with the bar at spaced points and each having angularly disposed web portions engageable with at least two angularly disposed faces of one of said frame members whereby the bumper is retained against vertical and lateral relative shifting, and means connecting the brackets with the frame members to permit relative longitudinal sliding therebetween.

3. A bumper construction for a vehicle having spaced longitudinal frame members of channel-like cross-sectional shape, comprising an impact bar and a pair of brackets connected with the bar at spaced points and each having angularly disposed web portions engageable with at least two angularly disposed faces of one of said frame members whereby the bumper is retained against vertical and lateral relative shifting, means connecting the brackets with the frame members to permit relative longitudinal sliding therebetween, and resilient cushioning means disposed between the bar and said frame members.

4. A bumper construction for a vehicle having spaced longitudinal frame members of channel-like cross-sectional shape and open at their forward ends, comprising an impact bar and a pair of brackets connected with the bar at spaced points and each having angularly disposed web portions engageable with at least two angularly disposed faces of one of said frame members whereby the bumper is retained against vertical and lateral relative shifting, means connecting the brackets with the frame members to permit relative longitudinal sliding therebetween, buffer seats extending transversely in the recesses of the frame members at points spaced rearwardly of their forward ends, and resilient cushioning means disposed in said frame members between the bar and said seats.

CALVIN L. HALLADAY.